United States Patent
Bagchi et al.

(10) Patent No.: US 9,965,971 B2
(45) Date of Patent: May 8, 2018

(54) SYSTEM AND METHOD FOR DOMAIN ADAPTATION IN QUESTION ANSWERING

(71) Applicant: International Business Machines Corporation, Armonk, NY (US)

(72) Inventors: Sugato Bagchi, White Plains, NY (US); David A. Ferrucci, Yorktown Heights, NY (US); David C. Gondek, Satellite Beach, FL (US); Anthony T. Levas, Yorktown Heights, NY (US); Wlodek W. Zadrozny, Tarrytown, NY (US)

(73) Assignee: International Business Machines Corporation, Armonk, NY (US)

(*) Notice: Subject to any disclaimer, the term of this patent is extended or adjusted under 35 U.S.C. 154(b) by 8 days.

(21) Appl. No.: 14/854,277

(22) Filed: Sep. 15, 2015

(65) Prior Publication Data

US 2016/0005324 A1    Jan. 7, 2016

Related U.S. Application Data

(62) Division of application No. 13/244,431, filed on Sep. 24, 2011, now Pat. No. 9,240,128.

(60) Provisional application No. 61/386,029, filed on Sep. 24, 2010.

(51) Int. Cl.
*G06F 17/30* (2006.01)
*G09B 7/00* (2006.01)

(52) U.S. Cl.
CPC ................................ *G09B 7/00* (2013.01)

(58) Field of Classification Search
CPC ......................................................... G09B 7/00
See application file for complete search history.

(56) References Cited

U.S. PATENT DOCUMENTS

| | | | |
|---|---|---|---|
| 5,634,051 A | 5/1997 | Thomson | |
| 5,794,050 A | 8/1998 | Dahlgren et al. | |
| 6,189,002 B1 | 2/2001 | Roitblat | |
| 7,092,928 B1 | 8/2006 | Elad et al. | |
| 7,181,438 B1 | 2/2007 | Szabo | |
| 7,430,505 B1 | 9/2008 | Horvitz et al. | |
| 7,558,778 B2 | 7/2009 | Carus et al. | |
| 7,590,606 B1 | 9/2009 | Keller et al. | |
| 7,630,986 B1 | 12/2009 | Herz et al. | |
| 8,145,624 B1 | 3/2012 | Srivastava et al. | |
| 8,335,794 B1* | 12/2012 | Goodson | G06F 17/3056 707/759 |
| 8,346,701 B2* | 1/2013 | Wang | G06F 17/30634 706/46 |
| 8,645,122 B1 | 2/2014 | Di Fabbrizio et al. | |
| 2002/0023144 A1* | 2/2002 | Linyard | G06F 9/4446 709/218 |
| 2003/0217052 A1 | 11/2003 | Rubenczyk et al. | |
| 2004/0254917 A1 | 12/2004 | Brill et al. | |

(Continued)

OTHER PUBLICATIONS http://www.openrdf.org/, 1997-2011, Aduna, Printed on Dec. 6, 2011.

(Continued)

*Primary Examiner* — Tarek Chbouki

(74) *Attorney, Agent, or Firm* — Scully, Scott, Murphy & Presser, P.C.

(57) ABSTRACT

The present disclosure relates generally to question answering systems and methods and, particularly, to systems and methods for domain adaptation in question answering.

1 Claim, 3 Drawing Sheets

(56) References Cited

U.S. PATENT DOCUMENTS

| | | | |
|---|---|---|---|
| 2005/0033711 A1* | 2/2005 | Horvitz | G06F 17/30687 706/50 |
| 2005/0054927 A1 | 3/2005 | Love | |
| 2005/0086045 A1* | 4/2005 | Murata | G06F 17/30654 704/2 |
| 2005/0105712 A1 | 5/2005 | Williams et al. | |
| 2005/0114327 A1 | 5/2005 | Kumamoto et al. | |
| 2005/0289168 A1 | 12/2005 | Green et al. | |
| 2006/0089824 A1 | 4/2006 | Siekmeier et al. | |
| 2006/0160055 A1 | 7/2006 | Osoegawa | |
| 2006/0183099 A1 | 8/2006 | Feely et al. | |
| 2006/0229909 A1 | 10/2006 | Kaila et al. | |
| 2006/0253418 A1 | 11/2006 | Charnock et al. | |
| 2007/0022099 A1 | 1/2007 | Yoshimura et al. | |
| 2007/0055656 A1 | 3/2007 | Tunstall-Pedoe | |
| 2007/0136246 A1 | 6/2007 | Stenchikova et al. | |
| 2007/0192321 A1* | 8/2007 | Farr | G06F 17/30902 |
| 2007/0224578 A1 | 9/2007 | De Ley et al. | |
| 2008/0010259 A1 | 1/2008 | Feng et al. | |
| 2008/0010274 A1 | 1/2008 | Carus et al. | |
| 2009/0037398 A1 | 2/2009 | Horvitz et al. | |
| 2009/0192966 A1 | 7/2009 | Horvitz et al. | |
| 2009/0254971 A1 | 10/2009 | Herz et al. | |
| 2009/0259642 A1 | 10/2009 | Cao et al. | |
| 2009/0287678 A1 | 11/2009 | Brown et al. | |
| 2009/0292687 A1 | 11/2009 | Fan et al. | |
| 2010/0100546 A1 | 4/2010 | Kohler | |
| 2010/0255455 A1 | 10/2010 | Velozo et al. | |
| 2010/0273138 A1 | 10/2010 | Edmonds et al. | |
| 2010/0318409 A1* | 12/2010 | Mayer | G06Q 10/067 705/325 |
| 2010/0324454 A1 | 12/2010 | Kircher et al. | |
| 2011/0010367 A1 | 1/2011 | Jockish et al. | |
| 2011/0066587 A1 | 3/2011 | Ferrucci et al. | |
| 2011/0235128 A1 | 9/2011 | Sisco | |
| 2011/0258034 A1 | 10/2011 | Metzler et al. | |
| 2011/0307435 A1 | 12/2011 | Overell et al. | |
| 2012/0191716 A1 | 7/2012 | Omoigui | |
| 2013/0041921 A1 | 2/2013 | Cooper et al. | |
| 2013/0097664 A1 | 4/2013 | Herz et al. | |

OTHER PUBLICATIONS

Fan, J., et al., "PRISMATIC: Including Knowledge from a Large Scale Lexicalized Relation Resource", NAACL HLT 2010 First International Workshop on Formalisms and Methodology for Learning by Reading, Association for Computational Linguistics, Jun. 2010, pp. 122-127.

https://uima.apache.org/sandbox.html, "Apache UIMA Addons and Sandbox", The Apache Software Foundation printed Sep. 6, 2011.

https://uima.apache.org, "Welcome to the Apache UIMA project", The Apache Software Foundation, Printed Aug. 31, 2011.

http://gate.ac.uk, "Gate" home page, The University of Sheffield, Document Printed 2011.

http://gate.ac.uk/sale/tao/splitch1.html, "Gate Chapter 1", The University of Sheffield 1995-2011, Printed Aug. 22, 2011.

http://gate.ac.uk/family/developer.html, "Gate Developer", The University of Sheffield 1995-2011, Printed Aug. 22, 2011.

University of Illinois at Urbana-Champaign, Department of Computer Science, Research, 2010 http://cs.illinois.edu/research?report=UIUCDCS-R-2008-2974.

National Center for Biotechnology Information (NCBI), Entrez the Life Sciences Search Engine, Oct. 28, 2009.

Adar, "SaRAD: a Simple and Robust Abbreviation Dictionary," BIOINFORMATICS, Mar. 2004, pp. 527-533, vol. 20, Issue 4.

Chang, J. T., et al., "Creating an Online Dictionary of Abbreviations from MEDLINE", Journal of the American Medical Informatics Association, Nov./Dec. 2002, vol. 9, No. 6, pp. 612-620.

Blitzer, J., et al., "Domain Adaptation of Natural Language Processing Systems", University of Pennsylvania, 2007, pp. 1-106.

Ferrucci, D., et al., "Building Watson: An Overview of the DeepQA Project", Association for the Advancement of Artificial Intelligence, Fall 2010, vol. 31, Issue 3, pp. 59-79.

Mahendra, R., et al., "Extending an Indonesian Semantic Analysis-based Question Answering System with Linguistic and World Knowledge Axioms", Proceedings of the 22nd Pacific Asia Conference on Language, Information, and Computation, 2008, pp. 262-271.

Lally, A., et al., "Natural Language Processing With Prolog in the IBM Watson System", The Association for Logic Programming (ALP) Newsletter, Mar. 2011.

Jing, H., et al., "Summarizing Noisy Documents", Proceedings of the Symposium on Document Image Understanding Technology, Apr. 2003, pp. 111-119.

Chiticariu, L., et al., "Domain Adaptation of Rule-Based Annotators for Named-Entity Recognition Tasks", EMNLP '10 Proceedings of the 2010 Conference on Empirical Methods in Natural Language Processing, Oct. 2010, pp. 1002-1012.

http://en.wikipedia.org/w/index.php?title=Named_entity_recognition&printable=yes, "Named entity recognition", Last Modified Jul. 12, 2011.

http://en.wikipedia.org/wiki/Ontology_(information_science), "Ontology (information science)", Last Modified Aug. 30, 2011.

http://en.wikipedia.org/wiki/Prolog, "Prolog", Last Modified Aug. 6, 2011.

http://en.wikipedia.org/wiki/question_answering, "Question answering", Last Modified Jun. 7, 2011.

https://secure.wikimedia.org/wikipedia/en/wiki/N-gram, "n-gram", Last Modified Sep. 5, 2011.

https://secure.wikimedia.org/wikipedia/en/wiki/Data_types, "Data type", Last Modified Sep. 5, 2011.

https://secure.wikimedia.org/wikipedia/en/wiki/Clustering_algorithm, "Cluster analysis", Last Modified Aug. 26, 2011.

https://secure.wikimedia.org/wikipedia/en/wiki/UIMA, "UIMA", Last Modified Aug. 27, 2011.

https://secure.wikimedia.org/wikipedia/en/wiki/Training_set, "Training set", Last Modified Dec. 5, 2010.

https://secure.wikimedia.org/wikipedia/en/wiki/Classification_%28machine_learning%29, "Statistical Classification", Last Modified Aug. 10, 2011.

Baldwin, H., "Smarter is: Making Watson smarter . . . faster", http://www.ibm.com/developerworks/data/library/dmmag, May 2011.

Schlaefer, N., et al., "Statistical Source Expansion for Question Answering", ACM Press, CIKM'11, Oct. 24-28, 2011, pp. 345-354.

http://en.wikipedia.org/wiki/Natural_launguage_processing, "Natural language processing", Last Modified Aug. 14, 2011.

Pastra, K., et al., "How feasible is the reuse of grammars for Named Entity Recognition?", Proceedings of 3rd Conference on Language Resources and Evaluation (LREC), 2002.

Apache UIMA Development Community, "UIMA Tutorial and Developers' Guides", The Apache Software Foundation, International Business Machines Corporation, Dec. 2010, pp. 1-140.

http://www.ask.com, printed on Dec. 8, 2011.

Moore, J., Language Generation for Spoken Dialogue Systems, Proceedings of the 13th European Workshop on Natural Language Generation (ENLG), Sep. 2011, pp. 132.

Chu-Carroll et al., "In Question-Answering, Two Heads are Better than One", HLT-NAACL'03, May-Jun. 2003, pp. 24-31, Edmonton, Canada.

Ferrucci et al., "Towards the Open Advancement of Question Answering Systems." IBM Technical Report RC24789, Computer Science, Apr. 22, 2009.

Moldovan et al., "COGEX: A Logic Prover for Question Answering." Proceedings of HLT-NAACL 2003, May-Jun. 2003, pp. 87-93, Edmonton.

Simmons, "Natural Language Question-Answering Systems: 1969." Communications of the ACM, Jan. 1970, pp. 15-30, 13(1).

Voorhees et al., "Overview of the TREC 2005 Question Answering Track." In Proceedings of the Fourteenth Text Retrieval Conference, 2005, Gaithersburg, Maryland.

(56) References Cited

OTHER PUBLICATIONS

Weinstein et al., Agents Swarming in Semantic Spaces to Corroborate Hypotheses, AAMAS'04, Jul. 19-23, 2004, New York, New York, USA, Copyright 2004 ACM 1-58113-864-4/04/0007.
Balahur, "Going Beyond Traditional QA Systems: Challenges and Keys in Opinions Question Answering," Coling 2010: Poster Volume, pp. 27-35, Beijing, Aug. 2010.
Chu-Carroll et al., "A Multi-Strategy and Multi-Source Approach to Question Answering", AAAI Press, 2004.
http://www.ncbi.nlm.nih.gov/sites/gquery, "GQuery: Global Cross-database NCBI search—NCBI", printed Apr. 17, 2014.
Lu, J. et al., "SOR: A Practical System for Ontology Storage, Reasoning and Search", VLDB '07 Proceedings of the 33rd International Conference on Very Large Data Bases, Sep. 23-28, 2007, pp. 1402-1405.
http://en.wikipedia/org/wiki/Question-answering,"Question answering", printed Jul. 25, 2011.
Office Action dated Jan. 26, 2017, received in a U.S. Appl. No. 14/854,579.

\* cited by examiner

SYSTEM AND METHOD FOR DOMAIN ADAPTATION IN QUESTION ANSWERING

CROSS-REFERENCE TO RELATED APPLICATIONS

The present application is a divisional application of U.S. Ser. No. 13/244,431 filed Sep. 24, 2011, which claims the benefit under 35 U.S.C. 119(e) of U.S. Provisional Application Ser. No. 61/386,029, filed Sep. 24, 2010. The entire contents and disclosures of the aforementioned applications are incorporated by reference as if fully set forth herein.

The present invention relates to commonly-owned, co-pending U.S. patent application Ser. No. 12/152,411, filed May 14, 2008, the entire contents and disclosure of which is incorporated by reference as if fully set forth herein.

The present invention relates to commonly-owned, co-pending U.S. patent application Ser. No. 12/126,642, filed May 23, 2008, the entire contents and disclosure of which is incorporated by reference as if fully set forth herein.

BACKGROUND

The present disclosure relates generally to question answering systems and methods and, particularly, to systems and methods for domain adaptation in question answering.

DESCRIPTION OF RELATED ART

Two patent application publications in the question/answer field are as follows:

U.S. patent application Ser. No. 12/152,411, filed May 14, 2008. This application relates to a system, method and computer program product for providing answers to questions based on any corpus of data. The method facilitates generating a number of candidate passages from the corpus that answer an input query, and finds the correct resulting answer by collecting supporting evidence from the multiple passages. By analyzing all retrieved passages and that passage's metadata in parallel, there is generated an output plurality of data structures including candidate answers based upon the analyzing. Then, by each of a plurality of parallel operating modules, supporting passage retrieval operations are performed upon the set of candidate answers, and for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers.

U.S. patent application Ser. No. 12/126,642, filed May 23, 2008. This application relates to a system, method and computer program product for conducting questions and answers with deferred type evaluation based on any corpus of data. The method includes processing a query including waiting until a "Type" (i.e. a descriptor) is determined AND a candidate answer is provided; the Type is not required as part of a predetermined ontology but is only a lexical/ grammatical item. Then, a search is conducted to look (search) for evidence that the candidate answer has the required LAT (e.g., as determined by a matching function that can leverage a parser, a semantic interpreter and/or a simple pattern matcher). In another embodiment, it may be attempted to match the LAT to a known Ontological Type and then look for a candidate answer up in an appropriate knowledge-base, database, and the like determined by that type. Then, all the evidence from all the different ways to determine that the candidate answer has the expected lexical answer type (LAT) is combined and one or more answers are delivered to a user.

SUMMARY

In one embodiment a starting point may comprise a question answering system and a new domain, wherein the new domain is specified at least by: (a) content data for the new domain; and (b) a question-answer set for the new domain.

In various examples, a domain adaptation system and method are provided for adapting the question answering system to the new domain. Such a domain adaptation system (and corresponding method) may comprise one or more of the following components: (1) content/resource adaptation module (in this example: (a) content may comprise database entries, XML files and/or text; (b) a resource may comprise a way to get to content such as one or more queries (e.g. a query from a SPARQL query engine into RDF data in a resource description framework)); (2) a training adaptation module; (3) a tooling adaptation module; and/or (4) a functional adaptation module.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
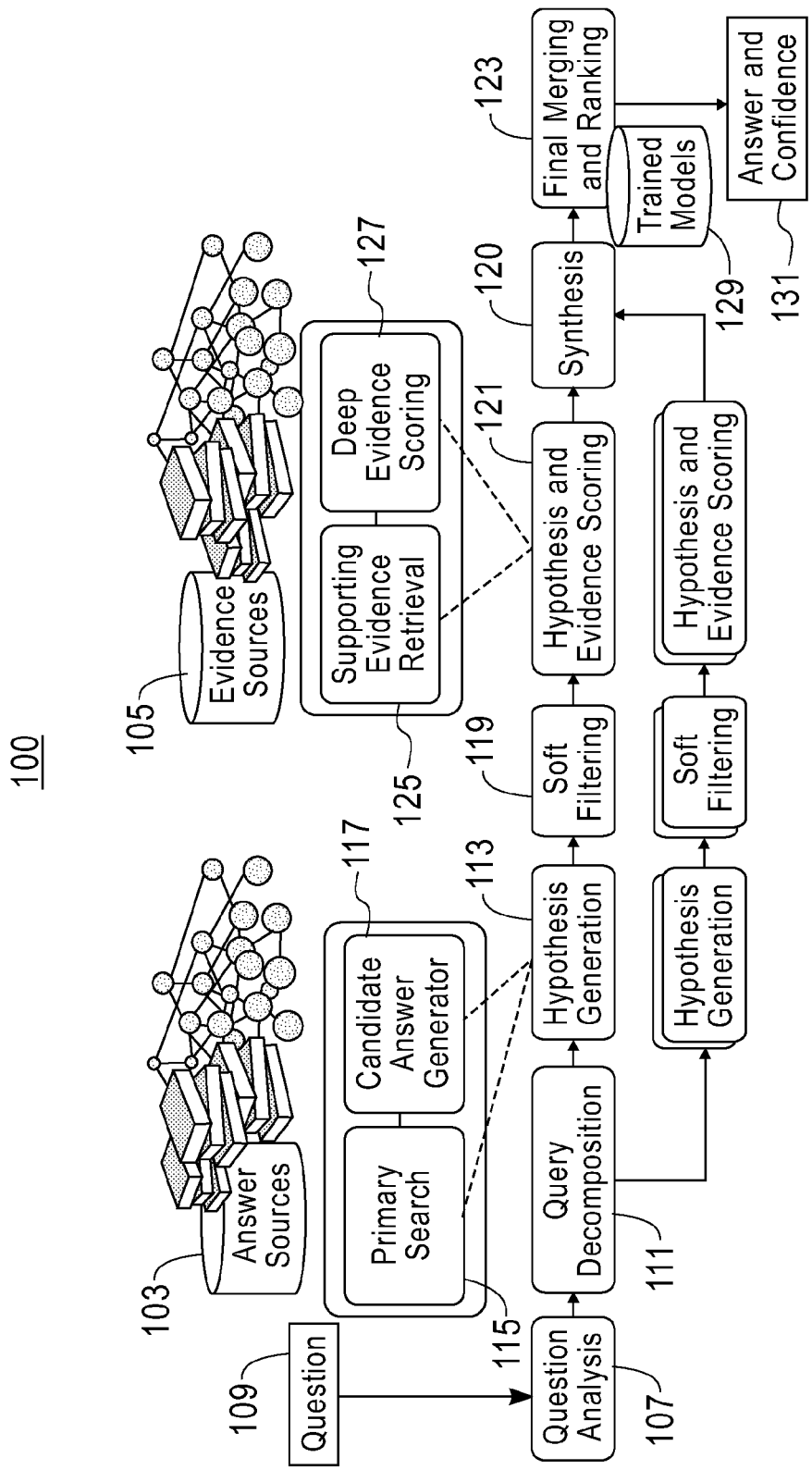
FIG. 1 depicts an architecture block diagram of an example question answering system that may be used in the context of various embodiments of the invention.

For the purposes of describing and claiming the present invention the term "question answering system" is intended to refer to a system (e.g., a computer-implemented system) for automatically answering questions posed in a natural language.

For the purposes of describing and claiming the present invention the term "question answering method" is intended to refer to a method (e.g., a computer-implemented method) for automatically answering questions posed in a natural language.

For the purposes of describing and claiming the present invention the term "question-answer set" is intended to refer to a collection of questions and correct answers to these questions, such that each question has one or more correct answers associated with it.

For the purposes of describing and claiming the present invention the term "automated grouping" is intended to refer to any computational method that takes a collection of terms and partitions them into one or more sets. Examples of grouping are clustering (as defined herein) and classifying (as defined herein).

For the purposes of describing and claiming the present invention the term "groups" (such as used in the context of generating a plurality of groups by performing automated grouping) is intended to refer to sets such as produced by automated grouping (such sets may be, for examples, clusters or classes).

For the purposes of describing and claiming the present invention the term "PRISMATIC" is intended to refer to a large scale lexicalized relation resource of the IBM Watson Research Lab.

For the purposes of describing and claiming the present invention the term "collection of related terms" (such as used in the context of creating a collection of related terms associated with the groups) is intended to refer to any mapping from group members to a collection of terms, e.g. such mapping could consist of adding synonyms (using e.g. Wordnet) and/or adding typical arguments (using e.g. Framenet., Verbnet or PRISMATIC) and/or adding co-occurring terms (using e.g. Google n-gram corpus).

For the purposes of describing and claiming the present invention the term "textual resources" is intended to refer to any electronic resources (e.g., any collection of electronic resources) containing text data (e.g. books, articles, encyclopedia, blog data, html pages), and/or any information derived from such text data appearing in textual format.

For the purposes of describing and claiming the present invention the term "clustering" is intended to refer to the assignment of a set of observations into subsets (called clusters) so that the observations in the same cluster are similar in some sense.

For the purposes of describing and claiming the present invention the term "classifying" is intended to refer to the identification of the sub-population to which new observations belong, where the identity of the sub-population is unknown, on the basis of a training set of data containing observations whose sub-population is known.

For the purposes of describing and claiming the present invention the term "world wide web" is intended to refer to the collection of Internet hyperlinked documents that are generally freely available.

For the purposes of describing and claiming the present invention the term "e-commerce source" is intended to refer to a paid source of information which may or may not be accessible via the world wide web (e.g., paid journals).

For the purposes of describing and claiming the present invention the term "n-gram collection" is intended to refer to a subsequence of n items from a given sequence.

For the purposes of describing and claiming the present invention the term "composite annotator" (or aggregate annotator) is intended to refer to a plurality of annotators working together. In one example, a composite annotator may be "an aggregate analysis engine" as defined in https://uima.apache.org/d/uimaj-2.3.1/tutorials_and_users_guides.pdf (e.g., starting at p. 19 "1.3. Building Aggregate Analysis Engines"). The entire contents and disclosure of this document is incorporated by reference as if fully set forth herein.

For the purposes of describing and claiming the present invention the term "trace data" is intended to refer to any metadata generated from one or more runs of a Question Answering system (e.g., this typically includes data on which components were used, what scores were assigned, etc.).

For the purposes of describing and claiming the present invention the term "training data" is intended to refer to a set of questions and corresponding answers that are used to discover potentially predictive relationships.

For the purposes of describing and claiming the present invention the term "training questions" is intended to refer to the questions component of a set of training data.

For the purposes of describing and claiming the present invention the term "training answers" is intended to refer to the answers component of a set of training data.

For the purposes of describing and claiming the present invention the term "annotator" is intended to refer to a component that contains or implements analysis logic For the purposes of describing and claiming the present invention the term "feature" is intended to refer to an annotation or data structure that can be assigned to a candidate answer, question, content or other feature or features. In one example, a feature could be a numerical value.

For the purposes of describing and claiming the present invention the term "scorer" is intended to refer to an annotator that generates a number or other indication regarding a collection of features.

For the purposes of describing and claiming the present invention the term "question type" is intended to refer to one of the classes into questions may be placed (e.g. "disease based on symptoms" question, or question classification may identify a question as a puzzle question, a math question, a definition question, and so on).

For the purposes of describing and claiming the present invention the term "headroom" is intended to refer to an estimate of possible improvement in a certain condition, e.g. if 48% of answers are wrong and with question analysis responsible for half of it and search for the other half, search has 24% headroom.

For the purposes of describing and claiming the present invention the term "content type" is intended to refer to any of text, semi-structured data (e.g., XML, RDF) and/or structured data (e.g., database tables).

Referring now to FIG. 1, an architecture block diagram of an example question answering system 100 that may be used in the context of various embodiments of the invention is shown (detail regarding the various architectural roles follows).

Content Acquisition

In this example architecture, the first step in solving a QA problem is content acquisition, or identifying and gathering the content to use for the answer sources 103 and evidence sources 105 shown in FIG. 1.

This content acquisition is a combination of manual and automatic steps. The first step is to analyze example questions from the problem space to produce a description of the kinds of questions that must be answered and a characterization of the application domain. Analyzing example questions is primarily a manual task, while domain analysis may be performed by automatic or statistical analyses, such as a LAT (lexical answer type) analysis. The sources may include a wide range of encyclopedias, dictionaries, thesauri, newswire articles, literary works, and so on.

Given a reasonable baseline corpus, the example question answering system 100 then applies an automatic corpus expansion process. The process involves four high-level steps: (1) identify seed documents and retrieve related documents from the web; (2) extract self-contained text nuggets from the related web documents; (3) score the nuggets based on whether they are informative with respect to the original seed document; and (4) merge the most informative nuggets into the expanded corpus.

In addition to the content for the answer and evidence sources, the example question answering system 100 leverages other kinds of semistructured and structured content. Another step in the content-acquisition process is to identify and collect these resources, which include databases, taxonomies, and ontologies, such as dbPedia, WordNet, and the Yago ontology.

Question Analysis

The first step in the run-time question-answering process is question analysis 107. During question analysis the system attempts to understand what the question 109 is asking and performs the initial analyses that determine how the question will be processed by the rest of the system. The example approach encourages a mixture of experts (programs) at this stage, and may produce shallow parses, deep parses, logical forms, semantic role labels, coreference, relations, named entities, and so on, as well as specific kinds of analysis for question answering. Most of these technologies are well understood to those of ordinary skill in the art and are not discussed further, but a few receive some elaboration.

Question Classification.

Question classification is the task of identifying question types or parts of questions that require special processing. This can include anything from single words with potentially double meanings to entire clauses that have certain syntactic, semantic, or rhetorical functionality that may inform downstream components with their analysis. Question classification may identify a question as a puzzle question, a math question, a definition question, and so on. It will identify puns, constraints, definition components, or entire subdues within questions.

Focus and LAT Detection.

A lexical answer type is a word or noun phrase in the question that specifies the type of the answer without any attempt to understand its semantics. Determining whether or not a candidate answer can be considered an instance of the LAT is an important kind of scoring and a common source of critical errors. An advantage to the example approach is to exploit many independently developed answer-typing algorithms. However, many of these algorithms are dependent on their own type systems. A way to integrate preexisting components is not to force them into a single, common type system, but to have them map from the LAT to their own internal types. The focus of the question is the part of the question that, if replaced by the answer, makes the question a stand-alone statement. In various examples, the focus of "When hit by electrons, a phosphor gives off electromagnetic energy in this form" is "this form"; the focus of "Secretary Chase just submitted this to me for the third time; guess what, pal. This time I'm accepting it" is the first "this"; and the focus of "This title character was the crusty and tough city editor of the Los Angeles Tribune" is "This title character." The focus often (but not always) contains useful information about the answer, is often the subject or object of a relation in the clue, and can turn a question into a factual statement when replaced with a candidate, which is a useful way to gather evidence about a candidate.

Relation Detection.

Most questions contain relations, whether they are syntactic subject-verb object predicates or semantic relationships between entities. For example, in the question, "They're the two states you could be reentering if you're crossing Florida's northern border," we can detect the relation borders (Florida,?x,north). This example uses relation detection throughout the QA process, from focus and LAT determination, to passage and answer scoring. This example can also use detected relations to query a triple store and directly generate candidate answers. Curated databases may be used by performing "look up" of the answers.

System 100 of this example may make use of existing databases in dependence on the ability to analyze the question and detect the relations covered by the databases. Broad domains make it difficult to identify the most important relations to detect and require new approaches such as the mixture of experts (mentioned above).

Decomposition.

An important requirement driven by analysis of various clues may be the ability to handle questions that are better answered through decomposition 111. System 100 of this example uses rule-based deep parsing and statistical classification methods both to recognize whether questions should be decomposed and to determine how best to break them up into subquestions. The operating hypothesis is that the correct question interpretation and derived answer(s) will score higher after all the collected evidence and all the relevant algorithms have been considered. Even if the question did not need to be decomposed to determine an answer, this method can help improve the system's overall answer confidence.

System 100 of this example solves parallel decomposable questions through application of the end-to-end QA system on each subdue and synthesizes the final answers by a customizable answer combination component. These processing paths are shown in FIG. 1 as: Query Decomposition, Hypothesis Generation, Soft Filtering, Hypothesis and Evidence Scoring, Synthesis. System 100 of this example also supports nested decomposable questions through recursive application of the end-to-end QA system to the inner subdue and then to the outer subdue. The customizable synthesis components allow specialized synthesis algorithms to be easily plugged into a common framework.

Hypothesis Generation

Hypothesis generation 113 takes the results of question analysis and produces candidate answers by searching the system's sources and extracting answer-sized snippets from the search results. Each candidate answer plugged back into the question is considered a hypothesis, which the system has to prove correct with some degree of confidence. We refer to search performed in hypothesis generation as "primary search" 115 to distinguish it from search performed during evidence gathering (described below). As with all aspects of this example system 100, a mixture of different approaches may be used for primary search and candidate generation.

Primary Search.

In primary search the goal is to find as much potentially answer-bearing content as possible based on the results of question analysis—the focus is squarely on recall with the expectation that the host of deeper content analytics will extract answer candidates and score this content plus whatever evidence can be found in support or refutation of candidates to drive up the precision. In one example, the system may be tuned to find the number of search results and candidates that produced the best balance of accuracy and computational resources. In one specific example, the operative goal for primary search stabilized at about 85 percent binary recall for the top 250 candidates; that is, the example system generates the correct answer as a candidate answer for 85 percent of the questions somewhere within the top 250 ranked candidates.

A variety of search techniques may be used, including the use of multiple text search engines with different underlying approaches (for example, Indri and Lucene), document search as well as passage search, knowledge base search using SPARQL on triple stores, the generation of multiple search queries for a single question, and backfilling hit lists to satisfy key constraints identified in the question.

Triple store queries in primary search may be based on named entities in the clue; for example, find all database entities related to the clue entities, or based on more focused queries in the cases that a semantic relation was detected. For a small number of LATs identified as "closed LATs," the candidate answer can be generated from a fixed list in some store of known instances of the LAT, such as "U.S. President" or "Country."

Candidate Answer Generation.

The search results feed into candidate generation 117, where techniques appropriate to the kind of search results are applied to generate candidate answers. For document search results from "title-oriented" resources, the title may be extracted as a candidate answer. The system may generate a number of candidate answer variants from the same title based on substring analysis or link analysis (if the underlying source contains hyperlinks). Passage search results require more detailed analysis of the passage text to identify candidate answers. For example, named entity detection may be used to extract candidate answers from the passage. Some sources, such as a triple store and reverse dictionary lookup, produce candidate answers directly as their search result.

If the correct answer(s) are not generated at this stage as a candidate, the example system 100 has no hope of answering the question. This step therefore significantly favors recall over precision, with the expectation that the rest of the processing pipeline will tease out the correct answer, even if the set of candidates is quite large. One of the goals of the example system design, therefore, is to tolerate noise in the early stages of the pipeline and drive up precision downstream. In one specific example, the system 100 may generate several hundred candidate answers at this stage.

Soft Filtering

A key step in managing the resource versus precision trade-off is the application of lightweight (less resource intensive) scoring algorithms to a larger set of initial candidates to prune them down to a smaller set of candidates before the more intensive scoring components see them. For example, a lightweight scorer may compute the likelihood of a candidate answer being an instance of the LAT. This step is called soft filtering 119

The system combines these lightweight analysis scores into a soft filtering score. Candidate answers that pass the soft filtering threshold proceed to hypothesis and evidence scoring 121, while those candidates that do not pass the filtering threshold are routed directly to the final merging stage 123. The soft filtering scoring model and filtering threshold are determined based on machine learning over training data. In one example, the system lets roughly 100 candidates pass the soft filter, but this may be a parameterizable function.

Hypothesis and Evidence Scoring Candidate answers that pass the soft filtering threshold undergo a rigorous evaluation process that involves gathering additional supporting evidence 125 for each candidate answer, or hypothesis, and applying a wide variety of deep scoring analytics 127 to evaluate the supporting evidence 105. Hypothesis and Evidence Scoring from a plurality of paths may be input to Synthesis 120.

Evidence Retrieval.

To better evaluate each candidate answer that passes the soft filter, the system gathers additional supporting evidence. The architecture supports the integration of a variety of evidence-gathering techniques. One particularly effective technique is passage search where the candidate answer is added as a required term to the primary search query derived from the question. This will retrieve passages that contain the candidate answer used in the context of the original question terms. Supporting evidence may also come from other sources like triple stores. The retrieved supporting evidence is routed to the deep evidence scoring components, which evaluate the candidate answer in the context of the supporting evidence.

Scoring.

The scoring step is where the bulk of the deep content analysis is performed. Scoring algorithms determine the degree of certainty that retrieved evidence supports the candidate answers.

The example framework supports and encourages the inclusion of many different components, or scorers, that consider different dimensions of the evidence and produce a score that corresponds to how well evidence supports a candidate answer for a given question.

This example system 100 provides a common format for the scorers to register hypotheses (for example candidate answers) and confidence scores, while imposing few restrictions on the semantics of the scores themselves; this enables the system developers to rapidly deploy, mix, and tune components to support each other. For example, the example system 100 employs more than 50 scoring components that produce scores ranging from formal probabilities to counts to categorical features, based on evidence from different types of sources including unstructured text, semistructured text, and triple stores. These scorers consider things like the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), its aliases, and so on.

Consider the question, "He was presidentially pardoned on Sep. 8, 1974"; the correct answer, "Nixon," is one of the generated candidates. One of the retrieved passages is "Ford pardoned Nixon on Sep. 8, 1974." One passage scorer counts the number of IDF-weighted terms in common between the question and the passage. Another passage scorer based on the Smith-Waterman sequence-matching algorithm, measures the lengths of the longest similar subsequences between the question and passage (for example "on Sep. 8, 1974"). A third type of passage scoring measures the alignment of the logical forms of the question and passage. A logical form is a graphical abstraction of text in which nodes are terms in the text and edges represent either grammatical relationships, deep semantic relationships, or both. The logical form alignment identifies Nixon as the object of the pardoning in the passage, and that the question is asking for the object of a pardoning. Logical form alignment gives "Nixon" a good score given this evidence. In contrast, a candidate answer like "Ford" would receive near identical scores to "Nixon" for term matching and passage alignment with this passage, but would receive a lower logical form alignment score.

Another type of scorer uses knowledge in triple stores, simple reasoning such as subsumption and disjointness in type taxonomies, geospatial, and temporal reasoning. Geospatial reasoning is used in the example system 100 to detect the presence or absence of spatial relations such as directionality, borders, and containment between geoentities. For example, if a question asks for an Asian city, then spatial containment provides evidence that Beijing is a suitable candidate, whereas Sydney is not. Similarly, geocoordinate information associated with entities is used to compute relative directionality (for example, California is SW of Montana; GW Bridge is N of Lincoln Tunnel, and so on).

Temporal reasoning is used in the example system 100 to detect inconsistencies between dates in the clue and those associated with a candidate answer. For example, the two most likely candidate answers generated by the system for the clue, "In 1594 he took a job as a tax collector in Andalusia," are "Thoreau" and "Cervantes." In this case, temporal reasoning is used to rule out Thoreau as he was not alive in 1594, having been born in 1817, whereas Cervantes, the correct answer, was born in 1547 and died in 1616.

With regard to each of the scorers implemented in the example system 100, how they work, how they interact, and their independent impact on the system's performance it is of note that in one specific example no one algorithm dominates. The example system's facility for absorbing these algorithms, and the tools for exploring their interactions and effects, may represent an important and lasting contribution.

To help developers and users get a sense of how the example system 100 uses evidence to decide between competing candidate answers, scores are combined into an overall evidence profile. The evidence profile groups individual features into aggregate evidence dimensions that provide a more intuitive view of the feature group. Aggregate evidence dimensions might include, for example, Taxonomic, Geospatial (location), Temporal, Source Reliability, Gender, Name Consistency, Relational, Passage Support, Theory Consistency, and so on. Each aggregate dimension is a combination of related feature scores produced by the specific algorithms that fired on the gathered evidence.

Consider the following question: Chile shares its longest land border with this country. In one specific example, evidence profiles for two candidate answers were produced by the system for this question: Argentina and Bolivia. Simple search engine scores favor Bolivia as an answer, due to a popular border dispute that was frequently reported in the news. The example system 100 prefers Argentina (the correct answer) over Bolivia, and the evidence profile shows why. Although Bolivia does have strong popularity scores, Argentina has strong support in the geospatial, passage support (for example, alignment and logical form graph matching of various text passages), and source reliability dimensions.

Final Merging and Ranking

It is one thing to return documents that contain key words from the question. It is quite another, however, to analyze the question and the content enough to identify the precise answer and yet another to determine an accurate enough confidence in its correctness to bet on it. The goal of final ranking and merging 123 is to evaluate the hundreds of hypotheses based on potentially hundreds of thousands of scores to identify the single best-supported hypothesis given the evidence and to estimate its confidence—the likelihood it is correct.

Answer Merging

Multiple candidate answers for a question may be equivalent despite very different surface forms. This is particularly confusing to ranking techniques that make use of relative differences between candidates. Without merging, ranking algorithms would be comparing multiple surface forms that represent the same answer and trying to discriminate among them. While one line of research has been proposed based on boosting confidence in similar candidates (Ko, Nyberg, and Luo 2007), the example approach is inspired by the observation that different surface forms are often disparately supported in the evidence and result in radically different, though potentially complementary, scores. This motivates an approach that merges answer scores before ranking and confidence estimation. Using an ensemble of matching, normalization, and coreference resolution algorithms, the example system 100 identifies equivalent and related hypotheses (for example, Abraham Lincoln and Honest Abe) and then enables custom merging per feature to combine scores.

Ranking and Confidence Estimation

After merging, the system must rank the hypotheses and estimate confidence based on their merged scores. A machine-learning approach was adopted that requires running the system over a set of training questions with known answers and training a model 129 based on the scores. One could assume a very flat model and apply existing ranking algorithms (for example, Herbrich, Graepel, and Obermayer [2000]; Joachims [2002]) directly to these score profiles and use the ranking score for confidence. For more intelligent ranking, however, ranking and confidence estimation 131 may be separated into two phases. In both phases sets of scores may be grouped according to their domain (for example type matching, passage scoring, and so on) and intermediate models trained using ground truths and methods specific for that task. Using these intermediate models, the example system produces an ensemble of intermediate scores. Motivated by hierarchical techniques such as mixture of experts (Jacobs et al. 1991) and stacked generalization (Wolpert 1992), a metalearner is trained over this ensemble. This approach allows for iteratively enhancing the system with more sophisticated and deeper hierarchical models while retaining flexibility for robustness and experimentation as scorers are modified and added to the system.

The example system 100 may have a metalearner that uses multiple trained models to handle different question classes as, for instance, certain scores that may be crucial to identifying the correct answer for a factoid question may not be as useful on puzzle questions.

Finally, an important consideration in dealing with NLP-based scorers is that the features they produce may be quite sparse, and so accurate confidence estimation requires the application of confidence-weighted learning techniques. (Dredze, Crammer, and Pereira 2008).

In one embodiment, a domain adaptation system and method are provided for adapting a question answering system to a new domain. Such a domain adaptation system (and corresponding method) may comprise one or more of the following components: (1) content/resource adaptation module; (2) training adaptation module; (3) tooling adaptation module; and/or (4) functional adaptation module. In this regard, various example modes of operation for the aforementioned components may be as follows:

Content/resource adaptation module: Using the question-answer set, performs an automated error analysis, and acquires content automatically. The automated error analysis comprises finding those questions in the question-answer set which are not currently answered by the QA system, finding if the associated answers have documents in the corpus about them (e.g. containing the answer terms as titles, or in passages together with the query terms), and identifying those that do not. Subsequently, other data sources (e.g. the Web or external publishers data) can be searched for missing content (e.g. using a query consisting of the answers terms that do not have document about them in the current corpus, optionally with one or more of the question terms). Finally, after identification of the potential content to acquire, an automated acquisition can be performed (through web crawl or e-commerce), and new resources added to the corpus.

Using automated error analysis (e.g., applying automated error analysis on a question-answer set (which may comprise, for example, training data with respect to domain adaptation)) and existing content this mode of operation identifies missing content (e.g. a list of treatments of diseases), acquires the content automatically (e.g. through corpus expansion such as world wide web searching/acquisition and/or e-commerce searching/acquisition), and creates automatically additional resources, such as n-gram collections and/or PRISMATIC (which looks for relations). In one example, the automated error analysis may comprise clustering and/or classification of questions and/or answers from the question-answer set for which the system does not produce correct answers). In one specific example, if the automated error analysis shows lack of "dosage guidelines", based on ontological property of "dosage" (which would be (drug, how much/amount, condition/disease, context/additional information)), assuming annotators/programs for detecting the drug names, conditions, amounts etc, exists, the system automatically creates pseudodocuments and/or tables containing only dosages data. Alternatively (or additionally), machine learning could be used to create dosage extractors based on existing content and the question-answer set. Of course, this is an example only, and operation may be applied to any desired domain.

Training adaptation module: Input is as above with regard to the question-answer set plus existing content. Input also comprises trace data from the question answer system. Output comprises the following: (a) estimates of need of training data for each question type; (b) proposals for which available features and scorers should be used in answering each question type (and then, for example, re-training the system using proposed features); (c) estimates of headroom per feature, headroom feature set, and/or or headroom content types; (d) types of functional adaptation required (if any). For example, identifying a collection of question features and/or answer features that are difficult to answer suggest the need for a new type of question and corresponding componentry (often different types of questions use different methods, and therefore different components).

Tooling adaptation module: Using statistical analysis of features and candidate answers, tooling adaptation suggests new types of queries (e.g., as applied to the IBM Watson Error Analysis Tool ("WEAT")), and the system automatically populates the database with information about these features, and displays the availability of the features to the user. These could be syntactic and/or semantic features (e.g. whether an answer/question a disease/symptoms pair, or is an answer a noun-noun compound). The adaptation might also suggest using the ontological features, or ontological classes (e.g. replacing textual answers by corresponding UMLS concepts (CUI values) or ontology references).

Functional adaptation module: Identifies a need for a new component by proposing a collection of features and examples coming from the training adaptation module (e.g. "medical tests" question answering submodule); or a module linking capable of generating some types of answers e.g. when content exists to answer the question (i.e. the correct answer can be found in the content database), but the candidate generation fails to generate it as a candidate.

In another embodiment, a method for providing adaptation to a question answering system, wherein the question answering system has associated therewith a question-answer set, is provided. This method comprises the steps of: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; generating a plurality of groups by performing automated grouping on at least one of: (a) a plurality of questions from the question-answer set that correspond to the identified answers that are not correct; and (b) a plurality of answers from the question-answer set that correspond to the identified answers that are not correct; creating a collection of related terms associated with the groups; obtaining, from a corpus of data, textual information about each of the related terms; and creating a plurality of textual resources from the obtained information.

In one example, each of the answers from the set of answers received back from the question answering system that are not correct may comprise one of: (a) an answer that is incorrect; and (b) an answer that is non-existent.

In this regard, in one example, we may either:
Get an answer on a list (correct answer);
Get an answer not on a list (incorrect answer);
Get nothing. In this case either:
    The system does not generate any candidate answers;
    The candidate answer(s) are of such low confidence that they are below a threshold, and therefore do not qualify for presentation to the user In another example, the generating a plurality of groups may comprise using at least one ontology.

In another example, the generating a plurality of groups may comprise at least one of: (a) clustering; and (b) classifying.

In another example, the generating a plurality of groups may comprise performing automated grouping on each of: (a) a plurality of questions from the question-answer set that correspond to the identified answers that are not correct; and (b) a plurality of answers from the question-answer set that correspond to identified answers that are not correct.

In another example, the obtaining may comprise at least one of: (a) obtaining from the world wide web; and (b) obtaining from an e-commerce source.

In another example, the creating a plurality of textual resources from the obtained information may comprise creating at least one of: (a) at least one n-gram collection; (b) at least one lexicalized relation resource; and (c) at least one new text document using information obtained from at least one of: (i) the world wide web; and (ii) an e-commerce source.

In another example, the question answering system may have associated therewith a first corpus of data and the corpus of data from which the textual information is obtained may be a second corpus of data.

In another example, the second corpus of data may be external relative to the first corpus of data.

In another embodiment, a method for providing adaptation to a question answering system, wherein the question answering system has associated therewith a question-answer set is provided. This method comprises the steps of: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; determining for each of the answers from the set of answers received back from the question answering system that are not correct a missing semantic data type, wherein the determining is performed by using a plurality of ontologies; and automatically creating a software program to run against a corpus of data to create at least one textual resource about each missing semantic data type; wherein the automatic creation comprises: (a) for each question with an answer that is not correct, obtaining a corresponding correct answer and computing for each corresponding correct answer an associated semantic data type; (b) for each semantic data type associated with a corresponding correct answer, finding a collection of words or expressions that are related to the semantic data type; and (c) for each the words or expressions that are in the collection that is found, obtaining additional related information from the world wide web and creating a new textual resource with the additional information.

In various embodiments, the following examples may apply:

For each question with a missing or incorrect answer, get the correct answer A and compute answer A's semantics data type sem(A). For example, if A is "hookworm", sem(A) would be "tropical_disease" (type) [could be more than one type]. This computation might be a look up in an ontology or finding in a corpus of data expressions "hookworm is X", and treating X as a semantic type. For example in addition to "tropical_disease" we can find "intestinal parasite" or "roundworm infestation".

For each sem(A), we find a collection of words or expressions w(sem(A)) that are related to it. To continue with the above example, if 'related' means 'is of the same type' the system might look up lists of "tropical diseases" or a list of "intestinal parasites" (this can be done by searching a corpus or the Internet for "list of tropical diseases" or "list of intestinal parasites" and retrieving the documents).

If an ontology is used in this example we can take the elements of the ontology whose type is "tropical disease" or "intestinal parasite" and avoid getting the information from the Internet at this point.

The w(sem(hookworm) would consist of all terms on the retrieved lists of tropical diseases and all terms on the lists of intestinal parasites.

For each of the terms t in all w(sem(A)) crawl the web for information on t (using, for example, corpus expansion techniques known to those of ordinary skill in the art), and create a new textual resource doc(t).

The above steps can be done for semantic types with a higher frequency of incorrect answers (above some cutoff)

Of note, an important point in the above example may be in the whole process of starting with wrong answers to getting the new textual resource.

In another example, each of the answers from the set of answers received back from the question answering system that are not correct may comprise one of: (a) an answer that is incorrect; and (b) an answer that is non-existent.

In this regard, in one example, we may either:
Get an answer on a list (correct answer);
Get an answer not on a list (incorrect answer);
Get nothing. In this case either:
The system does not generate any candidate answers;
The candidate answer(s) are of such low confidence that they are below a threshold.

In another example, the automatically creating a software program to run against the first corpus of data may comprise automatically creating a software program that uses existing components.

In another example, the software program may comprise a composite annotator.

In another example, each corresponding correct answer may be obtained from the question-answer set.

In another example, the computation may comprise a look up in an ontology.

In another example, the computing may comprise finding in a corpus of data one or more expressions and treating a portion of each expression as a semantic type.

In another example, the finding a collection of words or expressions that are related to the semantic data type may comprise searching a corpus or the Internet.

In another example, the finding a collection of words or expressions that are related to the semantic data type may comprise using an ontology.

In another embodiment, a method for providing adaptation to a question answering system, wherein the question answering system has associated therewith a plurality of trace data and a question-answer set is provided. This method comprises the steps of: submitting a set of questions to the question answering system; receiving back from the question answering system a set of answers generated in response to the set of questions; comparing the set of answers received back from the question answering system to answers in the question-answer set; and generating, based on the comparison and the plurality of trace data, an estimate of how much more training data is needed for each of a plurality of question types or answer types; wherein the training data comprises a plurality of training questions along with a corresponding plurality of correct training answers; wherein the trace data is generated during the generation of the set of answers; and wherein the step of generating further comprises the following steps: (a) for each question type, successively sample an increasing number of question-answer pairs from the question-answer set; (b) automatically train the question answering system using the sampled question-answer pairs; (c) automatically compute a functional dependence of the question answering system performance on the remaining questions relative to the size of the sample; and (d) extrapolate from the functional dependence a required number of training question-answer pairs of each question type required.

In various embodiments, the following examples may apply:

Starting with a method of assigning question type and/or answer type (this could be performed using any procedure known to one of ordinary skill in the art).

Figure 2:
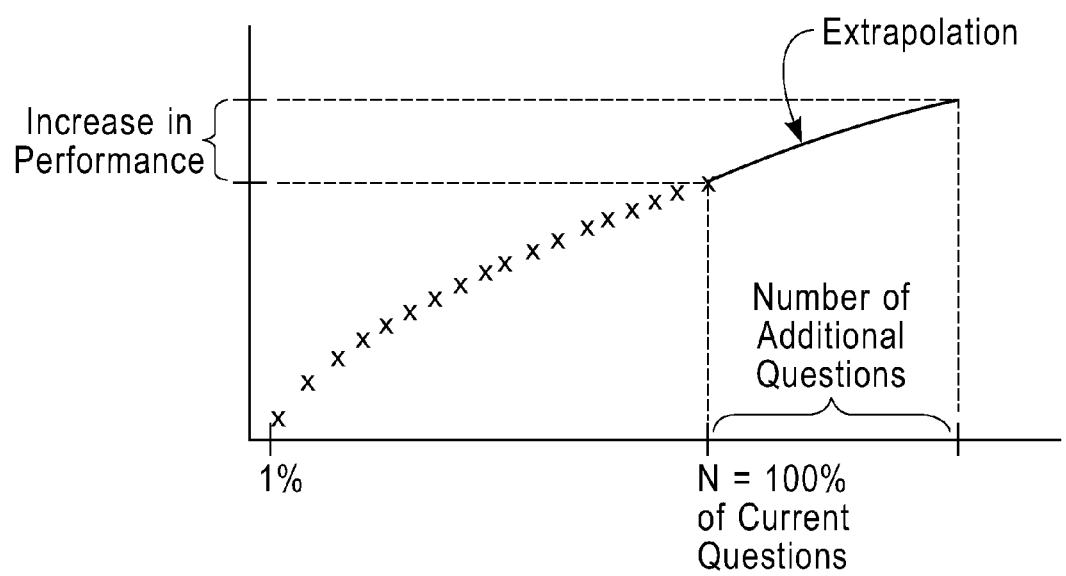
FIG. 2 depicts an example plot related to one embodiment of the present invention.

Next, for each question type Q' (with sufficiently large sample N of questions, minimum 2) there is a corresponding collection of correct answers A'. Successively sample say 1%, 2%, . . . 99% of questions from Q' and use it as training data, and observe (e.g., increase in) performance on the remaining questions. In a manner similar to the way that a human could plot this dependence of performance (accuracy or recall) on the training size, and extrapolate from this function (plot), a computer may extrapolate from the data and compute the required number of training question-answer pairs of type Q' required. FIG. 2 shows an associated example extrapolation plot.

Above could relate to question type(s) and/or answer type(s).

In another example, the plot of performance relates to at least one of: (a) accuracy; and (b) recall.

In another embodiment, a method for providing adaptation to a question answering system, wherein the question answering system has associated therewith a plurality of trace data and a question-answer set is provided. This method comprises the steps of: submitting a set of questions to the question answering system; receiving back from the question answering system a set of answers generated in response to the set of questions; comparing the set of answers received back from the question answering system to answers in the question-answer set; and generating, based on the comparison and the plurality of trace data, a plurality of proposals, wherein each of the proposals identifies at least one available feature and at least one available scorer that should be used in answering each of a plurality of question types; wherein the trace data is generated during the generation of the set of answers; and wherein the step of generating further comprises the following steps: (a) automatically computing a correlation between the use of at least one of: (i) one or more features and system performance on the set of questions of this type; and (ii) one or more scorers and system performance on the set of questions of this type; and (b) automatically identifying at least one of: (i) one or more features having a correlation with system performance; and (b) one or more scorers having a correlation with system performance.

In various embodiments, the following examples may apply:

Compute the correlation between the use of feature (or features) and/or scorer (or scorers) and system performance on the set of questions of this type. In one example, this can be done by removing a feature(s) (ablating) and testing the performance without the feature(s). The features that are correlated with the performance are the ones that are identified. This may similarly be performed with regard to scorers.

The above could be performed automatically (e.g., because you have a list of components).

In another example, the step of identifying may comprise identifying at least one of: (i) one or more features having a correlation with system performance above a threshold; and (b) one or more scorers having a correlation with system performance above a threshold.

In another embodiment, a method for providing adaptation to a question answering system, wherein the question answering system has associated therewith a plurality of trace data and a question-answer set is provided. This method comprises the steps of: submitting a set of questions to the question answering system; receiving back from the question answering system a set of answers generated in response to the set of questions; comparing the set of answers received back from the question answering system to answers in the question-answer set; and generating, based on the comparison and the plurality of trace data, an estimate of at least one of: (a) headroom per feature; (b) headroom per feature set; and (c) headroom per content type; wherein the trace data is generated during the generation of the set of answers.

In various embodiments, the following examples may apply:

Estimating headroom per content type:
Use the question and answers to find out for how many (or %) are missing content (i.e. there are no documents containing question terms and corresponding answer(s) together in proper relations (use known answer as a candidate to search+score [these may come from trace data]; see if the system doesn't generate the answer e.g. because search doesn't produce supporting documents). The number (or %) of such cases is the headroom.

In one specific example, if the question is "this parasitic infection of small intestines affects 25% of world population" and the answer is "hookworm". We use "hookworm" as a candidate answer together with the question and see if we can find documents that have both "hookworm" and "small intestines", and "hookworm" and "25% of world population". If not this indicates lack of content, and the question counts as an element of the headroom.

Estimating the headroom per feature (that we use to score answers):
Assume all features take values between. 0 and 1 (inclusive), and correct answers have (on average) higher feature values. Assign 1 to a candidate answer if it happens to be the correct answer to a question from the question-answer set. See how many new correct answers you get, this is the headroom.

In one specific example, using the above example, let the feature is "X is of type Y", if by assigning 1 to "hookworm is of type infectious disease" we make "hookworm" the #1 candidate answer (and if it wasn't before), the question/answer becomes element of the headroom (of course, this is an example, and the procedure can be done other ways).

Estimating headroom per feature set: in one example may be the same as above.

In one example, the headroom per feature may comprise a possible improvement relative to a feature having perfect performance on the question-answer set.

In another example, the headroom per feature set may comprise a possible improvement relative to a feature set having perfect performance on the question-answer set.

In another example, the headroom per content type may comprise a possible improvement relative to possible addition of new content for the question-answer set.

In another embodiment, a method for providing adaptation to a question answering system, wherein the question answering system has associated therewith a plurality of trace data and a question-answer set is provided. This method comprises the steps of: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; identifying, based on the answers that are not correct and the plurality of trace data, at least one type of functional adaptation required; wherein the trace data is generated during the generation of the set of answers; and wherein the step of identifying at least one functional adaptation further comprises the following steps: (a) identifying at least one of: (i) at least one question feature in the answers that are not correct; and (ii) at least one answer feature in the answers that are not correct; (b) comparing each identified feature to at least one feature in an annotator; and (c) based on the comparison made in step b, identifying at least one of: (i) a question feature that is not covered by at least one annotator; and (ii) an answer feature that is not covered by at least one annotator.

In various embodiments, the following examples may apply:

Identifying question feature(s) and/or answer feature(s) in the incorrect/missing set. Comparing these features(s) to the ones in current scorers and/or annotators (e.g., scorers and/or annotators currently associated with the questioning answering system). Identifying the feature(s) not covered by the current scorers and/or annotators.

In one example, let's assume a situation that 87% missing answers have a type "tropical disease" and the current scorer responsible for dealing with "X is of type Y" relation is not reliable for these questions/answers (e.g. gives incorrect or low confidence scores). Then we might generate here a proposal or suggestion for functional adaptation consisting of creating a module associated with the question answering system for "X is 'tropical disease'" relations, and justify it by the above failures.

In another example, each of the answers from the set of answers received back from the question answering system that are not correct may comprise one of: (a) an answer that is incorrect; and (b) an answer that is non-existent.

In this regard, in one example, we may either:
Get an answer on a list (correct answer);
Get an answer not on a list (incorrect answer);
Get nothing. In this case either:
 The system does not generate any candidate answers;
 The candidate answer(s) are of such low confidence that they are below a threshold.

In another example, the annotator may be a scorer.

In another example, the method may further comprise proposing, based upon the at least one type of functional adaptation identified, at least one of: (a) a collection of features; and (b) at least one new annotator.

In another example, the new annotator may be a scorer.

In another embodiment, a method for providing adaptation to a question answering system, wherein the question answering system has associated therewith at least one tool comprising a database containing trace data and a database query system is provided. This method comprises the steps of: submitting a set of questions to the question answering system; receiving back from the question answering system a set of answers generated in response to the set of questions; comparing the set of answers received back from the question answering system to answers in the question-answer set; creating at least one new field in the database; automatically collecting trace data about the value of the new field; and permitting querying on the new field; wherein the trace data is generated during the generation of the set of answers.

In various embodiments, the following examples may apply:
Various steps may comprise creating new fields in the database, and automatically collecting trace information about the value of these fields during execution and populating the associated query system such as to permit querying on these fields.

In other examples, various steps may comprise:
 a. Identify (using statistical correlations) new prominent features (e.g., non-numerical annotations) of the questions, answers and the executions on the question set (this may be carried out in an automated manner),
 b. Populating the database (e.g., field, column) with information from the trace data about these features,
 c. Allowing the database query system to accept queries about these features E.g. if the feature as above is "tropical disease" the database should be able to retrieve questions about "tropical disease" type of answer, and show this feature value for all generated candidate answers.

In another embodiment, a system for providing adaptation to a question answering system, wherein the question answering system has associated therewith a question-answer set, is provided. This system comprises one or more processor units configured for: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; generating a plurality of groups by performing automated grouping on at least one of: (a) a plurality of questions from the question-answer set that correspond to the identified answers that are not correct; and (b) a plurality of answers from the question-answer set that correspond to the identified answers that are not correct; creating a collection of related terms associated with the groups; obtaining, from a corpus of data, textual information about each of the related terms; and creating a plurality of textual resources from the obtained information.

In another embodiment, a system for providing adaptation to a question answering system, wherein the question answering system has associated therewith a question-answer set, is provided. This system comprises one or more processor units configured for: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; determining for each of the answers from the set of answers received back from the question answering system that are not correct a missing semantic data type, wherein the determining is performed by using a plurality of ontologies; and automatically creating a software program to run against a corpus of data to create at least one textual resource about each missing semantic data type; wherein the automatic creation comprises: (a) for each question with an answer that is not correct, obtaining a corresponding correct answer and computing for each corresponding correct answer an associated semantic data type; (b) for each semantic data type associated with a corresponding correct answer, finding a collection of words or expressions that are related to the semantic data type; and (c) for each the words or expressions that are in the collection that is found, obtaining additional related information from the world wide web and creating a new textual resource with the additional information.

In another embodiment, a system for providing adaptation to a question answering system, wherein the question answering system has associated therewith a plurality of trace data and a question-answer set, is provided. This system comprises one or more processor units configured for: submitting a set of questions to the question answering system; receiving back from the question answering system a set of answers generated in response to the set of questions; comparing the set of answers received back from the question answering system to answers in the question-answer set; and generating, based on the comparison and the plurality of trace data, an estimate of how much more training data is needed for each of a plurality of question types or answer types; wherein the training data comprises a plurality of training questions along with a corresponding plurality of correct training answers; wherein the trace data is generated during the generation of the set of answers; and wherein the step of generating further comprises the following steps: (a) for each question type, successively sample an increasing number of question-answer pairs from the question-answer set; (b) automatically train the question answering system using the sampled question-answer pairs; (c) automatically compute a functional dependence of the question answering system performance on the remaining questions relative to the size of the sample; and (d) extrapolate from the functional dependence a required number of training question-answer pairs of each question type required.

In another embodiment, a system for providing adaptation to a question answering system, wherein the question answering system has associated therewith a plurality of trace data and a question-answer set, is provided. This system comprises one or more processor units configured for: submitting a set of questions to the question answering system; receiving back from the question answering system a set of answers generated in response to the set of questions; comparing the set of answers received back from the question answering system to answers in the question-answer set; and generating, based on the comparison and the plurality of trace data, a plurality of proposals, wherein each of the proposals identifies at least one available feature and at least one available scorer that should be used in answering each of a plurality of question types; wherein the trace data is generated during the generation of the set of answers; and wherein the step of generating further comprises the following steps: (a) automatically computing a correlation between the use of at least one of: (i) one or more features and system performance on the set of questions of this type; and (ii) one or more scorers and system performance on the set of questions of this type; and (b) automatically identifying at least one of: (i) one or more features having a correlation with system performance; and (b) one or more scorers having a correlation with system performance.

In another embodiment, a system for providing adaptation to a question answering system, wherein the question answering system has associated therewith a plurality of trace data and a question-answer set, is provided. This system comprises one or more processor units configured for: submitting a set of questions to the question answering system; receiving back from the question answering system a set of answers generated in response to the set of questions; comparing the set of answers received back from the question answering system to answers in the question-answer set; and generating, based on the comparison and the plurality of trace data, an estimate of at least one of: (a) headroom per feature; (b) headroom per feature set; and (c) headroom per content type; wherein the trace data is generated during the generation of the set of answers.

In another embodiment, a system for providing adaptation to a question answering system, wherein the question answering system has associated therewith a plurality of trace data and a question-answer set, is provided. This system comprises one or more processor units configured for: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; identifying, based on the answers that are not correct and the plurality of trace data, at least one type of functional adaptation required; wherein the trace data is generated during the generation of the set of answers; and wherein the step of identifying at least one functional adaptation further comprises the following steps: (a) identifying at least one of: (i) at least one question feature in the answers that are not correct; and (ii) at least one answer feature in the answers that are not correct; (b) comparing each identified feature to at least one feature in an annotator; and (c) based on the comparison made in step b, identifying at least one of: (i) a question feature that is not covered by at least one annotator; and (ii) an answer feature that is not covered by at least one annotator.

In another embodiment, a system for providing adaptation to a question answering system, wherein the question answering system has associated therewith at least one tool comprising a database containing trace data and a database query system, is provided. This system comprises one or more processor units configured for: submitting a set of questions to the question answering system; receiving back from the question answering system a set of answers generated in response to the set of questions; comparing the set of answers received back from the question answering system to answers in the question-answer set; creating at least one new field in the database; automatically collecting trace data about the value of the new field; and permitting querying on the new field; wherein the trace data is generated during the generation of the set of answers.

In another embodiment, an article of manufacture is provided. The article of manufacture comprises: at least one tangible computer readable device having a computer readable program code logic tangibly embodied therein to execute at least one machine instruction in a processing unit for providing adaptation to a question answering system, wherein the question answering system has associated therewith a question-answer set. Said computer readable program code logic, when executing, performing the following steps: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; generating a plurality of groups by performing automated grouping on at least one of: (a) a plurality of questions from the question-answer set that correspond to the identified answers that are not correct; and (b) a plurality of answers from the question-answer set that correspond to the identified answers that are not correct; creating a collection of related terms associated with the groups; obtaining, from a corpus of data, textual information about each of the related terms; and creating a plurality of textual resources from the obtained information.

In another embodiment, an article of manufacture is provided. The article of manufacture comprises: at least one tangible computer readable device having a computer readable program code logic tangibly embodied therein to execute at least one machine instruction in a processing unit for providing adaptation to a question answering system, wherein the question answering system has associated therewith a question-answer set. Said computer readable program code logic, when executing, performing the following steps: submitting a set of questions to the question answering system; receiving back from the question answering system a set of answers generated in response to the set of questions;

comparing the set of answers received back from the question answering system to answers in the question-answer set; identifying, based on the comparison, a plurality of answers from the set of answers received back from the question answering system that are not correct; determining for each of the answers from the set of answers received back from the question answering system that are not correct a missing semantic data type, wherein the determining is performed by using a plurality of ontologies; and automatically creating a software program to run against a corpus of data to create at least one textual resource about each missing semantic data type; wherein the automatic creation comprises: (a) for each question with an answer that is not correct, obtaining a corresponding correct answer and computing for each corresponding correct answer an associated semantic data type; (b) for each semantic data type associated with a corresponding correct answer, finding a collection of words or expressions that are related to the semantic data type; and (c) for each the words or expressions that are in the collection that is found, obtaining additional related information from the world wide web and creating a new textual resource with the additional information.

In another embodiment, an article of manufacture is provided. The article of manufacture comprises: at least one tangible computer readable device having a computer readable program code logic tangibly embodied therein to execute at least one machine instruction in a processing unit for providing adaptation to a question answering system, wherein the question answering system has associated therewith a plurality of trace data and a question-answer set. Said computer readable program code logic, when executing, performing the following steps: submitting a set of questions to the question answering system; receiving back from the question answering system a set of answers generated in response to the set of questions; comparing the set of answers received back from the question answering system to answers in the question-answer set; and generating, based on the comparison and the plurality of trace data, an estimate of how much more training data is needed for each of a plurality of question types or answer types; wherein the training data comprises a plurality of training questions along with a corresponding plurality of correct training answers; wherein the trace data is generated during the generation of the set of answers; and wherein the step of generating further comprises the following steps: (a) for each question type, successively sample an increasing number of question-answer pairs from the question-answer set; (b) automatically train the question answering system using the sampled question-answer pairs; (c) automatically compute a functional dependence of the question answering system performance on the remaining questions relative to the size of the sample; and (d) extrapolate from the functional dependence a required number of training question-answer pairs of each question type required.

In another embodiment, an article of manufacture is provided. The article of manufacture comprises: at least one tangible computer readable device having a computer readable program code logic tangibly embodied therein to execute at least one machine instruction in a processing unit for providing adaptation to a question answering system, wherein the question answering system has associated therewith a plurality of trace data and a question-answer set. Said computer readable program code logic, when executing, performing the following steps: submitting a set of questions to the question answering system; receiving back from the question answering system a set of answers generated in response to the set of questions; comparing the set of answers received back from the question answering system to answers in the question-answer set; and generating, based on the comparison and the plurality of trace data, a plurality of proposals, wherein each of the proposals identifies at least one available feature and at least one available scorer that should be used in answering each of a plurality of question types; wherein the trace data is generated during the generation of the set of answers; and wherein the step of generating further comprises the following steps: (a) automatically computing a correlation between the use of at least one of: (i) one or more features and system performance on the set of questions of this type; and (ii) one or more scorers and system performance on the set of questions of this type; and (b) automatically identifying at least one of: (i) one or more features having a correlation with system performance; and (b) one or more scorers having a correlation with system performance.

In another embodiment, an article of manufacture is provided. The article of manufacture comprises: at least one tangible computer readable device having a computer readable program code logic tangibly embodied therein to execute at least one machine instruction in a processing unit for providing adaptation to a question answering system, wherein the question answering system has associated therewith a plurality of trace data and a question-answer set. Said computer readable program code logic, when executing, performing the following steps: submitting a set of questions to the question answering system; receiving back from the question answering system a set of answers generated in response to the set of questions; comparing the set of answers received back from the question answering system to answers in the question-answer set; and generating, based on the comparison and the plurality of trace data, an estimate of at least one of: (a) headroom per feature; (b) headroom per feature set; and (c) headroom per content type; wherein the trace data is generated during the generation of the set of answers.

In another embodiment, an article of manufacture is provided. The article of manufacture comprises: at least one tangible computer readable device having a computer readable program code logic tangibly embodied therein to execute at least one machine instruction in a processing unit for providing adaptation to a question answering system, wherein the question answering system has associated therewith a plurality of trace data and a question-answer set. Said computer readable program code logic, when executing, performing the following steps: submitting a set of questions to the question answering system; receiving back from the question answering system a set of answers generated in response to the set of questions; comparing the set of answers received back from the question answering system to answers in the question-answer set; identifying, based on the comparison, a plurality of answers from the set of answers received back from the question answering system that are not correct; identifying, based on the answers that are not correct and the plurality of trace data, at least one type of functional adaptation required; wherein the trace data is generated during the generation of the set of answers; and wherein the step of identifying at least one functional adaptation further comprises the following steps: (a) identifying at least one of: (i) at least one question feature in the answers that are not correct; and (ii) at least one answer feature in the answers that are not correct; (b) comparing each identified feature to at least one feature in an annotator; and (c) based on the comparison made in step b, identifying at least one of: (i) a question feature that is not covered by at least one annotator; and (ii) an answer feature that is not covered by at least one annotator.

In another embodiment, an article of manufacture is provided. The article of manufacture comprises: at least one tangible computer readable device having a computer readable program code logic tangibly embodied therein to execute at least one machine instruction in a processing unit for providing adaptation to a question answering system, wherein the question answering system has associated therewith at least one tool comprising a database containing trace data and a database query system. Said computer readable program code logic, when executing, performing the following steps: submitting a set of questions to the question answering system; receiving back from the question answering system a set of answers generated in response to the set of questions; comparing the set of answers received back from the question answering system to answers in the question-answer set; creating at least one new field in the database; automatically collecting trace data about the value of the new field; and permitting querying on the new field; wherein the trace data is generated during the generation of the set of answers.

Figure 3:
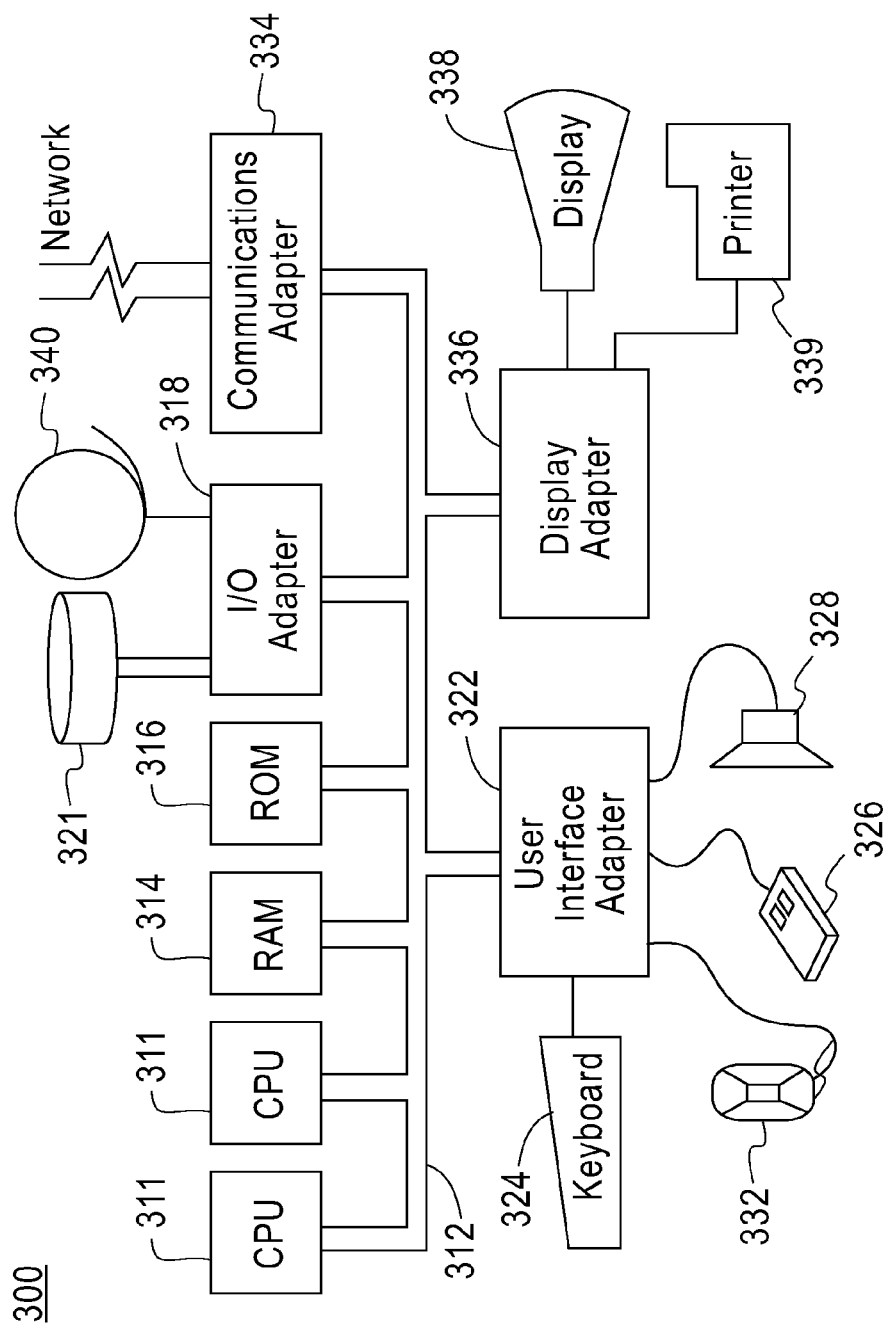
FIG. 3 depicts a block diagram of a hardware configuration of a computing system according to an embodiment of the present invention.

Referring now to FIG. 3, this Fig. shows a hardware configuration of computing system 300 according to an embodiment of the present invention. As seen, this hardware configuration has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communications adapter 334 for connecting the system 300 to a data processing network, the Internet, an Intranet, a local area network (LAN), etc., and a display adapter 336 for connecting the bus 312 to a display device 338 and/or printer 339 (e.g., a digital printer or the like).

In another example, adaptation may be triggered by statistical properties of the artifacts existing in the system (e.g., content, question-answer sets, etc) and/or created by the systems (e.g., the domain adaption system and/or the question answering system).

In another example, there may be the additional dimension of knowing what to adapt vs. knowing how to adapt.

Ontologies adaptation could be another example of content/resource adaptation where the system might identify that tycor is missing hyponymy relations for the new domain and these relations are automatically generated using existing tools. Once generated (and scored) they may become a new resource.

In another example, various embodiments may relate to domain adaptation (e.g., systems and or methods) utilizing one or more software components.

In another example, systems and methods for adaptation (e.g., domain adaptation) are provided, wherein the question answering system comprises specific adaptation points and methods comprise sets of steps guided by evidence to achieve the adaptation.

In other examples, any steps described herein may be carried out automatically.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for providing adaptation to a question answering system, wherein the question answering system has associated therewith a plurality of trace data and a question-answer set, the method comprising the steps of:
submitting a set of questions to the question answering system;
receiving back from the question answering system a set of answers generated in response to the set of questions, said set of answers obtained based on content of documents;
comparing the set of answers received back from the question answering system to answers in the question-answer set; and
generating, based on the comparison and the plurality of trace data, an estimate of headroom per content type, said headroom per content type estimated as a percentage or number of documents lacking the question and answer content, where the question counts as an element of the headroom, the headroom per content type comprising a possible improvement relative to possible addition of new content for the question-answer set;
wherein the trace data is generated during the generation of the set of answers.

* * * * *